United States Patent Office

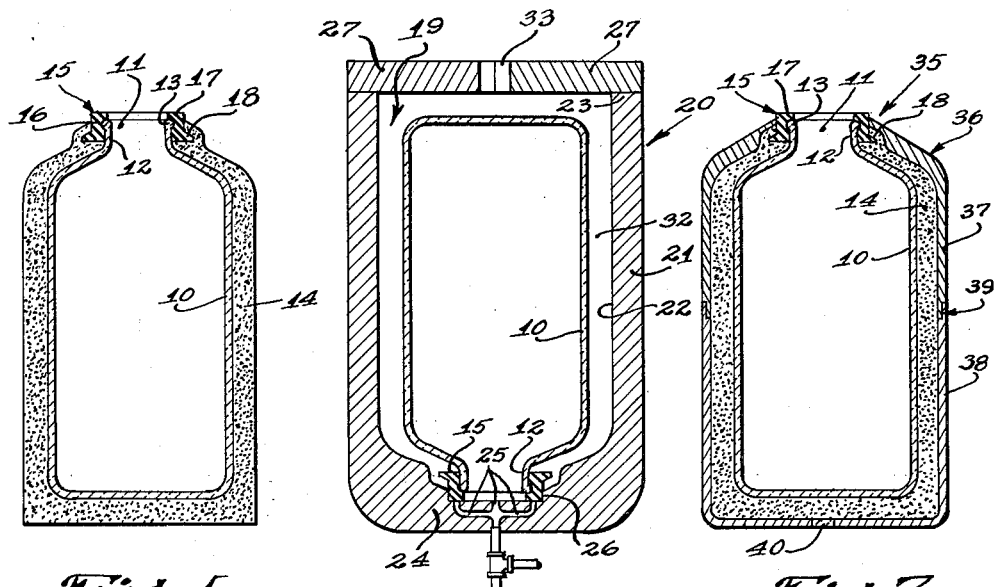

3,037,652
Patented June 5, 1962

3,037,652
RECEPTACLE HAVING PROTECTIVE COATING
Robert T. Wallace, Toledo, Ohio, assignor to Owens-Illinois Glass Company, a corporation of Ohio
Filed Sept. 18, 1956, Ser. No. 610,594
7 Claims. (Cl. 215—13)

The present invention relates generally to an improved method of a coating articles with plastic materials, and more particularly to an improved method of coating articles with plastic materials having integrated cellular structures, and the articles thereby produced.

In the prior art, thermos bottles have generally been constructed essentially from two principal parts; namely, an outer casing which is usually of metallic or plastic construction, and a double-walled vacuum bottle which is nested within the outer casing. The vacuum bottle has customarily been constructed from glass and formed with a very thin wall section to better enable it to withstand the thermal shock to which the vacuum bottle is subjected when hot or cold substances are rapidly introduced therein. This thin-walled glass construction presents a problem, however, since the resultant vacuum bottle is quite frangible and easily broken, even after it has been placed within the protective confines of the outer casing. The fragile character of the vacuum bottle is quite objectionable since a thermos bottle is ordinarily subjected to repeated use and handling. The present invention is adapted to overcome this problem and provides a novel method of coating various glass, plastic, and metallic surfaces with a cellular impact-resistant material having excellent thermal insulating characteristics.

Accordingly, a principal object of this invention is the provision of a method for providing an article having a cellular plastic covering bonded thereto which imparts improved shock resistance and insulating characteristics to said article.

Another object of the present invention is the provision of an improved insulated container having a protective cellular coating bonded to the surface thereof in such manner as to greatly increase the shock resistance and insulating characteristics of the container.

The specific nature of this invention, as well as other objects and advantages thereof, will hereinafter become apparent to those skilled in the art from the following detailed description, taken in conjunction with the annexed drawings on which, by way of preferred example only, are illustrated the preferred embodiments of this invention.

On the drawings:

FIG. 1 is a schematic elevational view in central section of an insulated container constructed in accordance with the present invention.

FIG. 2 is a diagrammatic illustration of apparatus suitable for practicing the present invention.

FIGS. 3, 4, 5, and 6 are diagrammatic fragmentary sectional views illustrating various method steps of this invention.

FIG. 7 is a modification of the container illustrated in FIG. 1.

With reference to FIG. 1, numeral 10 represents a container suitable for holding various hot or cold liquids. Optionally, the container 10 may have a cross-sectional shape of either regular or irregular conformation. The container 10 is formed with a restricted neck portion 12 defining a filling and dispensing opening 11 and terminating in a smooth beaded finish 13. Since the container 10 will normally be utilized to contain both hot and cold substances of various kinds, it is preferable that it should be constructed from materials which are capable of withstanding substantial temperature extremes and which are substantially corrosion-resistant, such as glass or heat and chemical-resistant plastic materials, including the copolymer molding compounds of styrene acrylonitrile or other similar materials. Surrounding the container 10 is a protective cellular plastic covering 14 of substantial thickness and of integrated structure which provides both thermal insulation and shock resistance to the container. Integrated as used herein with reference to the cellular covering 14 means a unified or consolidated structure bonded together without using additional adhesives or binders. The cellular plastic covering 14 is preferably formed from a polymerizable material which is capable of being easily foamed and which, when polymerized, will adhesively bond to the surface of the container 10. Such covering 14 is applied by methods hereinafter described.

Mounted on the neck portion 12 there is an annular neck-ring 15 which is constructed from a material possessing high impact resistance such as rubber, polyethylene, a high impact modified polystyrene, or other similar material. The neck-ring 15 defines an annular groove 16 on its inner surface which receives the beaded finish 13. The uppermost end of the neck-ring 15 terminates in an inwardly projecting annular rim 17 which overlaps the beaded finish 13 and affords protection thereto against breakage, such as might be occasioned by accidentally dropping the container 10. On the lowermost end of the neck-ring 15, there is an outwardly projecting lip portion 18 which is embedded within the cellular plastic covering 14 to prevent the neck-ring from becoming dislodged from the neck portion 12.

In forming an insulated container such as is illustrated in FIG. 1, the container 10 is placed in an inverted position within a cavity type mold 20, as illustrated in FIG. 2. As illustrated, the mold cavity 19 is substantially larger than the container 10 in both its diametrical and longitudinal dimensions so that container 10, when nested therein, is in spaced relationship with the wall 21 and upper end 23 of the mold.

The cavity defining surface 22 of the mold 20 is shaped to conform to the exterior configuration desired upon the cellular covering to be formed. Centrally defined in the lowermost end 24 of the mold 20 is a circular recess 26 which communicates with the mold cavity 19 and which forms a seat for the neck-ring 15 and additionally serves to position the container 10 concentrically within the mold. Communicating with the recess 26 are a plurality of conduits 25 which extend through the mold 20 and which are suitably connected to external sources of vacuum and pressured air, not illustrated. When a vacuum is applied through these conduits 25, the neck-ring 15 is drawn firmly into the recess 26 and maintains the container 10 in concentrically aligned position within the mold 20.

After the container 10 has been properly positioned and a vacuum applied to the neck-ring 15, a removable split mold cover 27 is placed upon the upper end 23 of the mold 20 and a measured amount of a liquid mixture of a foamable polyurethane type prepolymer, a tertiary amine catalyst, and water are charged into the mold 20 through a restricted filling opening 33 in the mold cover 27. Alternatively, the liquid mixture may be comprised of an aromatic diisocyanate, preferably toluene 2,4 diisocyanate, a polyol or polyester resin, a tertiary amine catalyst such as N-methylmorpholine, tripropylamine or the like, and water. The liquid mixture is preferably prepared, however, from materials of the type commercially available from various suppliers in the form of ready-to-mix prepolymer and catalyst preparations. One such preparation, marketed under the trademark of "Isofoam," is available from Isocyanate Products, Inc., Wilmington, Delaware. When these materials are mixed at room temperature, or 85° F., the polyurethane prepolymer undergoes an exothermic condensation—polymerization reaction and liberates carbon dioxide gas which in turn foams the mixture. Therefore, it is preferable that the prepolymer, catalyst and water should be mixed simultaneously with their introduction into the mold 20 in order to permit sufficient time for the liquid mixture to flow down into the mold 20 and surround the neck portion 12 of the container 10, as illustrated in FIG. 3, before any substantial foaming takes place. In this manner, it will be insured that as the liquid mixture begins to foam, as illustrated in FIG. 4, the foam will be continuously generated in an upward direction and dispel substantially all of the air in the space 32 between the container 10 and the mold 20 by forcing air out through the filling opening 33. In this manner, the entrapment of large air pockets in the cellular material, which reduce the insulating and shock-resisting properties of the completed article, may be substantially eliminated.

The amount of liquid mixture 28 charged into the mold 20 should be slightly in excess of the amount calculated to fill the space 32 between the container 10 and mold 20 with foam 29 so that, as illustrated in FIG. 5, some of the foam 29 produced will of necessity exude out through the filling opening 33, and thereby insure that the space 32 is completely filled. After the foam 29 has set a sufficient time to rigidy, the split mold cover 27 may be separated and removed from the mold 20, as illustrated in FIG. 6, so that the exuded foamed material 30 may be severed as by shears 31. The vacuum in the conduits 25 is then replaced with pressured air which ejects the container 10 together with the adherent foamed cellular covering 14 out of the mold 20.

To improve the durability and appearance of the cellular covering 14, a protective coating of decorative moisture-resistant material may be applied to the exterior surface 32 thereof. Alternatively, the insulated container 10 may be used as a replacement liner for thermos bottles, in which event the insulated liner would be enclosed within an outer casing in much the same manner as conventional vacuum bottles are so enclosed.

A modified construction of an insulated container, such as may be produced by this invention, is illustrated in FIG. 7, wherein there is illustrated a thermos bottle 35 having a plastic or metallic two-piece casing 36 surrounding and bonded to the cellular covering 14 of the container 10. In producing such a thermos bottle 35 in accordance with this invention, the two halves 37 and 38 of the casing are enclosed around the container 10 and take the place of a mold such as the mold 20 previously described. To hold the casing halves 37 and 38 together, the mating edges thereof, as at 39, are preferably coated with an adhesive material. The casing 36 and container 10 are then placed in an inverted position and charged with a liquid mixture of foamable material in the same manner as was set forth utilizing the mold 20, except that in this instance the liquid mixture is charged either through the restricted filling opening 40 provided in the bottom of the casing 36, or through a needle nozzle which may puncture directly through the bottom of the casing.

A polyurethane mixture of the type previously described will form an excellent bond with metallic compositions and most plastic compositions. Among the most notable plastic compositions with which the mixture will not bond are polyethylene, the chlorinated and fluorinated derivatives of polyethylene, and silicones. Hence, these non-bonding plastic compositions may be utilized for coating or lubricating the surfaces of the mold 20 which come into contact with polyurethane foam during the formation of liner 14 to prevent the liner from adhering to the mold. Alternatively, the mold 20 may be directly formed from one of these non-bonding materials. Additionally, a thermos bottle 35, such as is illustrated in FIG. 7, may be formed, which has the casing 36 directly bonded to the liner 14, or readily releasable therefrom, depending upon the selection of the appropriate plastic or metallic material from which the casing is fabricated.

Among the outstanding advantages of this invention is the provision of an economical method for coating containers or other articles with a shock-resistant cellular insulating material, which method is readily adaptable to producing inexpensive substantially unbreakable insulated containers, thermos bottles, or replacement liners for thermos bottles. Additionally, the present invention provides a method whereby the cellular material may be directly bonded to the article to be covered without the need of adhesives or additional fabricating steps.

Another advantage of the present invention resides in the provision of a method whereby frangible articles, such as glass, may be protectively coated with a cellular material which, in addition to cushioning the article against impact, also bonds to the glass and prevents the glass from shattering in the event it is broken.

I claim:

1. An insulated receptacle comprising a single-walled container having an open end and an axially opposite closed end, a foamed plastic body of integrated structure adjacently surround said container, an impact-resistant neck-ring snugly surrounding the open end of said container, said neck-ring having an inwardly projecting annular rim overlapping the open end of said container and a lip portion embedded within said foamed plastic body anchoring said neck-ring in assembly on said container.

2. The combination defined in claim 1, wherein said foamed plastic body comprises the reaction product of an aromatic diisocyanate, a polyol and water.

3. The combination defined in claim 1, wherein said foamed plastic body comprises the reaction product of a polyurethane prepolymer and water.

4. The combination defined in claim 1, wherein said foamed plastic body comprises the reaction product of a polyester resin, an aromatic diisocyanate and water.

5. The combination defined in claim 1, wherein said foamed plastic body comprises the reaction product of a polyester resin, toluene 2,4 diisocyanate and water.

6. An insulated receptacle comprising: a single-walled glass container having an open end and an axially opposite closed end, a polymerized plastic body of an integrated cellular structure surrounding said container and being bonded thereto, said body being a polymerized toluene 2,4 diisocyanate resin, said bonding resulting from the polymerization of said body, an impact-resistant neck-ring snugly surrounding the open end of said container, said neck-ring having an inwardly projecting annular rim overlappig the open end of said container and an outwardly projecting lip portion embedded within said body.

7. An insulated receptacle comprising a container having a single thickness glass wall portion and an open end axially opposite a closed end, a cellular plastic jacket of integrated structure bonded to said wall portion in surrounding relationship and forming the exterior surface of said receptacle, an impact-resistant neck-ring snugly surrounding the open end of said container, said neck-ring having an internally projecting annular rim overlapping said open end and an outwardly projecting lip portion embedded within said cellular plastic jacket.

References Cited in the file of this patent

UNITED STATES PATENTS

| | | |
|---|---|---|
| 2,054,323 | Holbrook | Sept. 15, 1936 |
| 2,128,239 | Ferngren | Aug. 30, 1938 |
| 2,216,830 | Roberts | Oct. 8, 1940 |
| 2,484,309 | Noeth | Oct. 11, 1949 |
| 2,552,641 | Morrison | May 15, 1951 |
| 2,639,252 | Simon et al. | May 19, 1953 |
| 2,653,139 | Sterling | Sept. 22, 1953 |
| 2,657,431 | Slaughter | Nov. 3, 1953 |
| 2,685,319 | Swasko | Aug. 3, 1954 |
| 2,753,642 | Sullivan | July 10, 1956 |
| 2,780,350 | Simon et al. | Feb. 5, 1957 |

OTHER REFERENCES

Article on "Expanding Fields for Expanded Plastics" by Charles A. Breskin, published in the Scientific American Magazine, September 1947.